(12) United States Patent
Krapfl

(10) Patent No.: US 11,465,479 B2
(45) Date of Patent: Oct. 11, 2022

(54) VEHICLE OVERHEAD COVER SYSTEM

(71) Applicant: Clifford Krapfl, Chicago, IL (US)

(72) Inventor: Clifford Krapfl, Chicago, IL (US)

(73) Assignee: FCA US LLC, Auburn Hills, MI (US)

( * ) Notice: Subject to any disclaimer, the term of this patent is extended or adjusted under 35 U.S.C. 154(b) by 51 days.

(21) Appl. No.: 17/069,956

(22) Filed: Oct. 14, 2020

(65) Prior Publication Data

US 2022/0111713 A1    Apr. 14, 2022

(51) Int. Cl.
*B60J 7/14* (2006.01)
*B60J 7/08* (2006.01)
*B60J 7/11* (2006.01)
*B60J 7/10* (2006.01)
*B60R 21/13* (2006.01)

(52) U.S. Cl.
CPC .............. *B60J 7/145* (2013.01); *B60J 7/085* (2013.01); *B60J 7/106* (2013.01); *B60J 7/11* (2013.01); *B60R 2021/132* (2013.01)

(58) Field of Classification Search
CPC ..... B60J 7/02; B60J 7/04; B60J 7/1628; B60J 7/1635; B60J 7/1642; B60J 10/02; B60J 7/085; B60J 7/106; B60J 7/11; B60J 7/145; B62D 25/06; B60R 2021/132
USPC ....... 296/210, 216.04, 218, 224, 216.07, 56, 296/146.8, 107.01
See application file for complete search history.

(56) References Cited

U.S. PATENT DOCUMENTS

| | | | | |
|---|---|---|---|---|
| 4,821,394 A | * | 4/1989 | Martinez-Vera | B60J 7/106 296/218 |
| 5,089,912 A | * | 2/1992 | Simin | B60J 1/2041 296/97.4 |
| 5,711,568 A | | 1/1998 | Diem et al. | |
| 5,762,393 A | | 6/1998 | Darmas | |
| 6,012,759 A | | 1/2000 | Adamek | |
| 6,782,904 B2 | | 8/2004 | Tien | |
| 6,811,207 B2 | * | 11/2004 | Dalpizzol | B60J 5/101 135/88.01 |
| 7,137,661 B2 | | 11/2006 | Neuer et al. | |
| 7,240,960 B2 | | 7/2007 | Fallis, III et al. | |
| 8,256,492 B2 | | 9/2012 | Lin | |
| 8,302,655 B2 | | 11/2012 | Lin | |

(Continued)

FOREIGN PATENT DOCUMENTS

KR    100587937 B1  *  6/2006

OTHER PUBLICATIONS

Song Sung Sub, "Structure of sun-shade for vehicle", Jun. 2006, KPO (Year: 2006).*

*Primary Examiner* — Joseph D. Pape
*Assistant Examiner* — Veronica M Shull
(74) *Attorney, Agent, or Firm* — Ralph E. Smith

(57) ABSTRACT

A convertible top system for a vehicle having structural support for a vehicle roof includes an overhead cover system having a perimeter frame configured to couple to the structural support and defining a plurality of overhead openings, and a plurality of cassettes configured to releasably couple to the perimeter frame such that each cassette of the plurality of cassettes is operably associated with one of the overhead openings. Each cassette of the plurality of cassettes includes at least one of a retractable mesh screen and a retractable shade configured to be moved between a fully open position that does not cover the associated overhead opening, and a fully closed position that covers the associated overhead opening.

19 Claims, 3 Drawing Sheets

(56) References Cited

U.S. PATENT DOCUMENTS

| | | | |
|---|---|---|---|
| 8,622,457 B1* | 1/2014 | McIntire | B60J 7/106 |
| | | | 296/213 |
| 8,662,563 B1 | 3/2014 | Hardenbrook | |
| 8,727,414 B2 | 5/2014 | Staib | |
| 8,991,896 B1* | 3/2015 | Whitehead | B60J 7/196 |
| | | | 296/121 |
| 9,889,726 B2* | 2/2018 | Umeki | B60J 1/2041 |
| 9,950,598 B2 | 4/2018 | Stickles et al. | |
| 10,173,507 B2* | 1/2019 | Rodriguez | B60J 1/1838 |
| 10,611,217 B2* | 4/2020 | Willard | B60J 7/192 |
| 10,787,131 B2* | 9/2020 | Marchlewski | B60R 9/04 |
| 2001/0054833 A1 | 12/2001 | Wingen et al. | |
| 2002/0145310 A1 | 10/2002 | Schatzler et al. | |
| 2002/0167202 A1 | 11/2002 | Pfalzgraf | |
| 2010/0314903 A1* | 12/2010 | Voyer | B60J 5/104 |
| | | | 296/146.8 |
| 2015/0028630 A1 | 1/2015 | Grimm et al. | |
| 2019/0054806 A1 | 2/2019 | Getzschman et al. | |
| 2019/0184800 A1 | 6/2019 | Nania | |
| 2019/0241053 A1* | 8/2019 | Desai | B60J 1/14 |

* cited by examiner

VEHICLE OVERHEAD COVER SYSTEM

FIELD

The present application relates generally to convertible top systems for a vehicle and, more particularly, to a vehicle modular overhead cover assembly with an individual compartmental sun shade and mesh screen.

BACKGROUND

It is known in the motor vehicle art to provide a convertible top, which may be folded back or removed from the vehicle. In one example, the convertible top is constructed of a hard material (e.g., referred to as a hard top) or a flexible fabric (e.g., referred to as a soft top) and is folded back to a storage position or otherwise removed from an installed position. Such tops provide a user with the benefit of open air driving while affording available protection in the event of adverse weather conditions when in the storage position. However, adverse weather conditions can be bothersome when traveling while the convertible top is removed and unavailable. Accordingly, while known convertible top systems work well for their intended purpose, it is desirable to provide an improved vehicle soft top system.

SUMMARY

In accordance with an exemplary aspect of the invention, a convertible top system for a vehicle having structural support for a vehicle roof is provided. In one example implementation, the convertible top system includes an overhead cover system having a perimeter frame configured to couple to the structural support and defining a plurality of overhead openings, and a plurality of cassettes configured to releasably couple to the perimeter frame such that each cassette of the plurality of cassettes is operably associated with one of the overhead openings. Each cassette of the plurality of cassettes includes at least one of a retractable mesh screen and a retractable shade configured to be moved between a fully open position that does not cover the associated overhead opening, and a fully closed position that covers the associated overhead opening.

In addition to the foregoing, the described convertible top system may include one or more of the following features: wherein each cassette of the plurality of cassettes includes both the retractable mesh screen and the retractable shade; wherein each cassette of the plurality of cassettes further includes a housing rotatably supporting a roller bar operably associated with a retractor mechanism; wherein each of the at least one retractable mesh screen and retractable shade include a first end coupled to the roller and are configured to be rolled up on the roller bar; and wherein each of the at least one retractable mesh screen and retractable shade further include an opposite second end having a handle with an attachment device, wherein a user is able to grasp the handle to draw the mesh screen or the shade to the fully closed position and couple the attachment device to the perimeter frame.

In addition to the foregoing, the described convertible top system may include one or more of the following features: wherein each of the at least one retractable mesh screen and retractable shade are configured to slide along a track formed in the perimeter frame when moving between the fully opened and fully closed positions; wherein the perimeter frame includes a pair of laterally spaced main side frame members and a pair of laterally spaced forward side frame members; and wherein the perimeter frame further comprises a forward transverse frame member coupled between the forward side frame members, an intermediate transverse frame member coupled between the main side frame members, and a forward dividing frame member coupled between the forward transverse frame member and the intermediate transverse frame member, wherein the forward transverse frame member, the intermediate transverse frame member, and the forward dividing frame member define (i) a driver overhead opening over a driver seat of the vehicle and (ii) a passenger overhead opening above a passenger seat of the vehicle, each of (i) and (ii) configured to receive and be selectively covered by one of the cassettes.

In addition to the foregoing, the described convertible top system may include one or more of the following features: wherein the perimeter frame further includes a front intermediate transverse frame member coupled between the main side frame members, a rear intermediate transverse frame member coupled between the main side frame members, and a rearward dividing frame member coupled between the front intermediate transverse frame member and the rear intermediate transverse frame member, wherein the a front intermediate transverse frame member, the rear intermediate transverse frame member, and the rearward dividing frame member define (i) a second row driver side overhead opening over a second row seat and (ii) a second row passenger side overhead opening over the second row seat, each of (i) and (ii) configured to receive and be selectively covered by one of the cassettes.

In addition to the foregoing, the described convertible top system may include one or more of the following features: wherein the perimeter frame further includes an intermediate transverse frame member coupled between the main side frame members, and a rearward transverse frame member, wherein the intermediate transverse frame member and the rearward transverse frame member define a rear cargo area overhead opening disposed above a rear cargo area of the vehicle and configured to receive and be selectively covered by one of the cassettes; wherein the perimeter frame further includes a pair of laterally spaced apart vertical members, a rearward transverse frame member coupled between the main side frame members, and a liftgate frame member rotatably coupled to at least one of the vertical members and the rearward transverse member and movable between a closed position and an open position, wherein the liftgate frame member defines a rear opening configured to receive and be selectively covered by one of the cassettes.

In addition to the foregoing, the described convertible top system may include one or more of the following features: wherein the perimeter frame further comprises a telescoping frame telescopically coupled to the liftgate frame member and defining a telescoping frame opening configured to be selectively covered by one of the cassettes to establish a shaded canopy when the liftgate is in the open position and the telescoping frame is telescoped; further including the vehicle roof, which is configured to removably couple to the vehicle over the overhead cover system, such that the overhead cover system is disposed between the structural support and the vehicle roof; and wherein the vehicle roof is a hard top assembly configured to be removably coupled to the vehicle.

In accordance with another exemplary aspect of the invention, a vehicle is provided. In one example implementation, the vehicle includes a body, a structural support for a vehicle roof, and an overhead cover system. The overhead cover system includes a perimeter frame configured to couple to the structural support and defining a plurality of overhead openings, and a plurality of cassettes configured to releasably couple to the perimeter frame such that each cassette of the plurality of cassettes is operably associated with one of the overhead openings. Each cassette of the plurality of cassettes includes at least one of a retractable mesh screen and a retractable shade configured to be moved between a fully open position that does not cover the associated overhead opening, and a fully closed position that covers the associated overhead opening.

In addition to the foregoing, the described vehicle may include one or more of the following features: wherein the overhead cover system further comprises the vehicle roof, which is configured to removably couple to the vehicle over the overhead cover system, such that the overhead cover system is disposed between the structural support and the vehicle roof, wherein each cassette of the plurality of cassettes includes both the retractable mesh screen and the retractable shade, and wherein each cassette of the plurality of cassettes further includes a housing rotatably supporting a roller bar operably associated with a retractor mechanism; and wherein the perimeter frame further includes a pair of laterally spaced apart vertical members, and a liftgate frame member rotatably coupled to at least one of the vertical members and the rearward transverse member and movable between a closed position and an open position, wherein the liftgate frame member defines a rear opening configured to receive and be selectively covered by one cassette of the plurality of cassettes.

In addition to the foregoing, the described vehicle may include one or more of the following features: wherein the perimeter frame includes a pair of laterally spaced main side frame members, a pair of laterally spaced forward side frame members, a forward transverse frame member coupled between the forward side frame members, a front intermediate transverse frame member coupled between the main side frame members, a rear intermediate transverse frame member coupled between the main side frame members, a rearward transverse frame member coupled between the main side frame members, a forward dividing frame member coupled between the forward transverse frame member and the front intermediate transverse frame member, and a rearward dividing frame member coupled between the front intermediate transverse frame member and the rear intermediate transverse frame member. The perimeter frame defines a driver overhead opening over a driver seat of the vehicle and configured to receive and be selectively covered by one cassette of the plurality of cassettes, a passenger overhead opening above a passenger seat of the vehicle and configured to receive and be selectively covered by one cassette of the plurality of cassettes, a second row driver side overhead opening over a second row seat of the vehicle and configured to receive and be selectively covered by one cassette of the plurality of cassettes, a second row passenger side overhead opening over the second row seat of the vehicle and configured to receive and be selectively covered by one cassette of the plurality of cassettes, and a rear cargo area overhead opening disposed above a rear cargo area of the vehicle and configured to receive and be selectively covered by one cassette of the plurality of cassettes.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

According to the principles of the present application, systems and methods are described for convertible top systems for vehicles. In the example embodiments, the convertible top systems include a removable roof and a modular overhead cover system that is exposed when the roof is removed. The overhead cover system is made up of multiple modular compartments that can be removed or installed as desired. The overhead cover system includes a perimeter frame structure defining the modular compartments, which support cassettes at header and cross-sections of the vehicle.

Each cassette houses a combination shade and mesh screen that can each be retracted or deployed depending on the weather or personal preference. In one example, the overhead cover system comprises five cassettes including driver overhead, passenger overhead, second row driver side, second row passenger side, and rear cargo area cassettes. Additionally, when a liftgate is open, the rear cargo cassette can extend underneath the glass and out the back of the vehicle via a telescoping frame that supports the extended shade/mesh screen combination to provide a shaded canopy at the rear of the vehicle.

Figure 1:
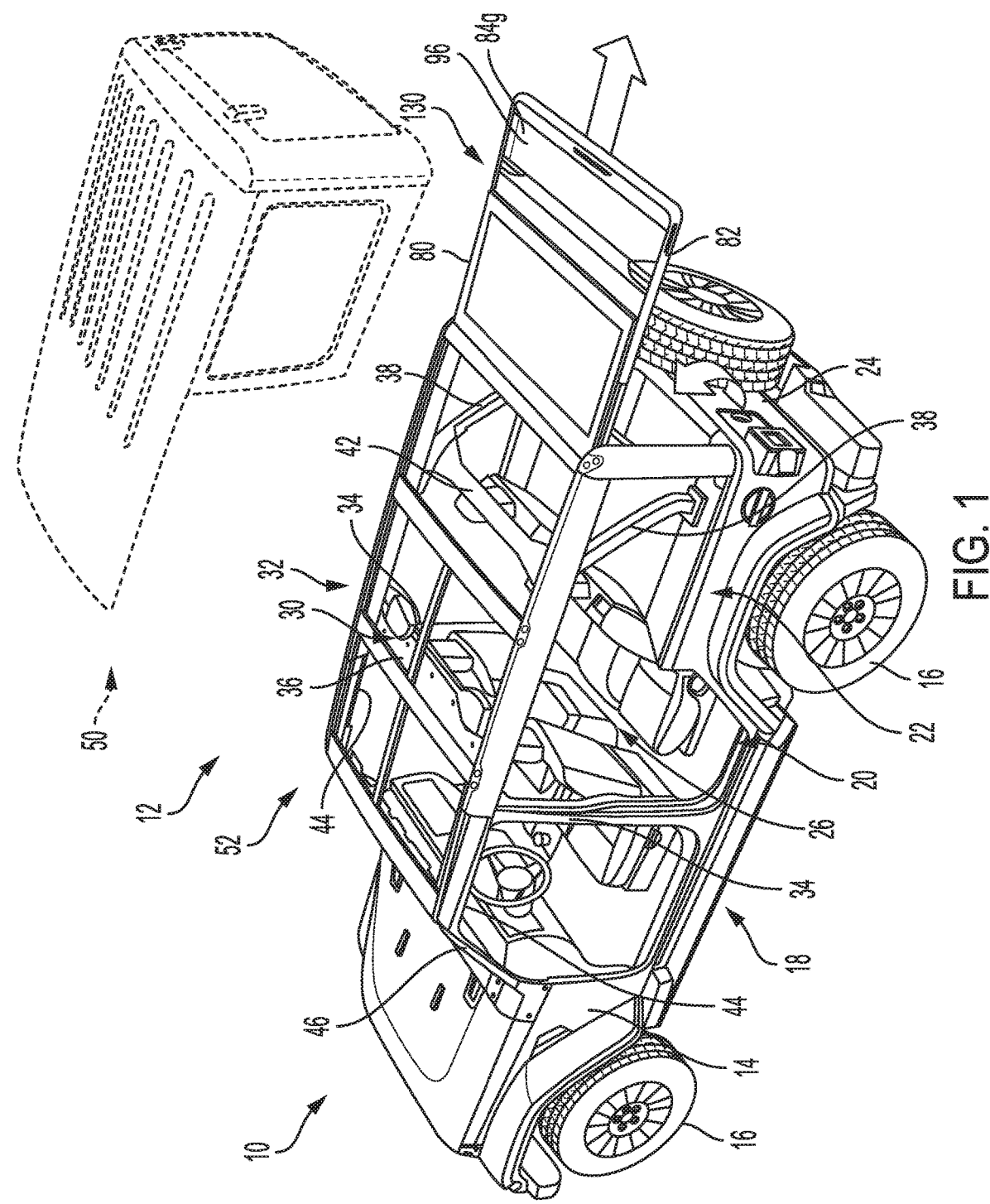
FIG. 1 is a top perspective view of a vehicle with an example modular overhead cover assembly in accordance with the principles of the present disclosure.

With initial reference to FIG. 1, a vehicle 10 having a convertible top system 12 in accordance with the principles of the present disclosure is illustrated. In the example embodiment, the vehicle 10 generally includes a vehicle body 14, vehicle road wheels 16, front passenger seating 18, rear passenger seating 20, and a rear cargo area 22 at least partially enclosed by a tailgate 24.

As seen in FIG. 1, a roll bar assembly 30 extends upwardly from the vehicle body 14 and includes a generally U-shaped main roll bar 32 formed by a pair of laterally spaced apart vertical members 34 interconnected by a transverse member 36. A pair of rear roll or sport bars 38 are coupled to the main roll bar 32 and extend rearward therefrom and downwardly to the vehicle body 14. The sport bars 38 are interconnected by a rear transverse member 42. A pair of side bars 44 are coupled to the main roll bar 32 and extend forwardly to a vehicle windshield assembly 46. Although not shown, portions of the roll bar assembly 30 may be covered with a protective padding. Moreover, although the vehicle 10 and roll bar assembly 30 are illustrated in FIG. 1 as a four-door configuration, the vehicle may be arranged in other configurations such as a two-door configuration.

Figure 2:
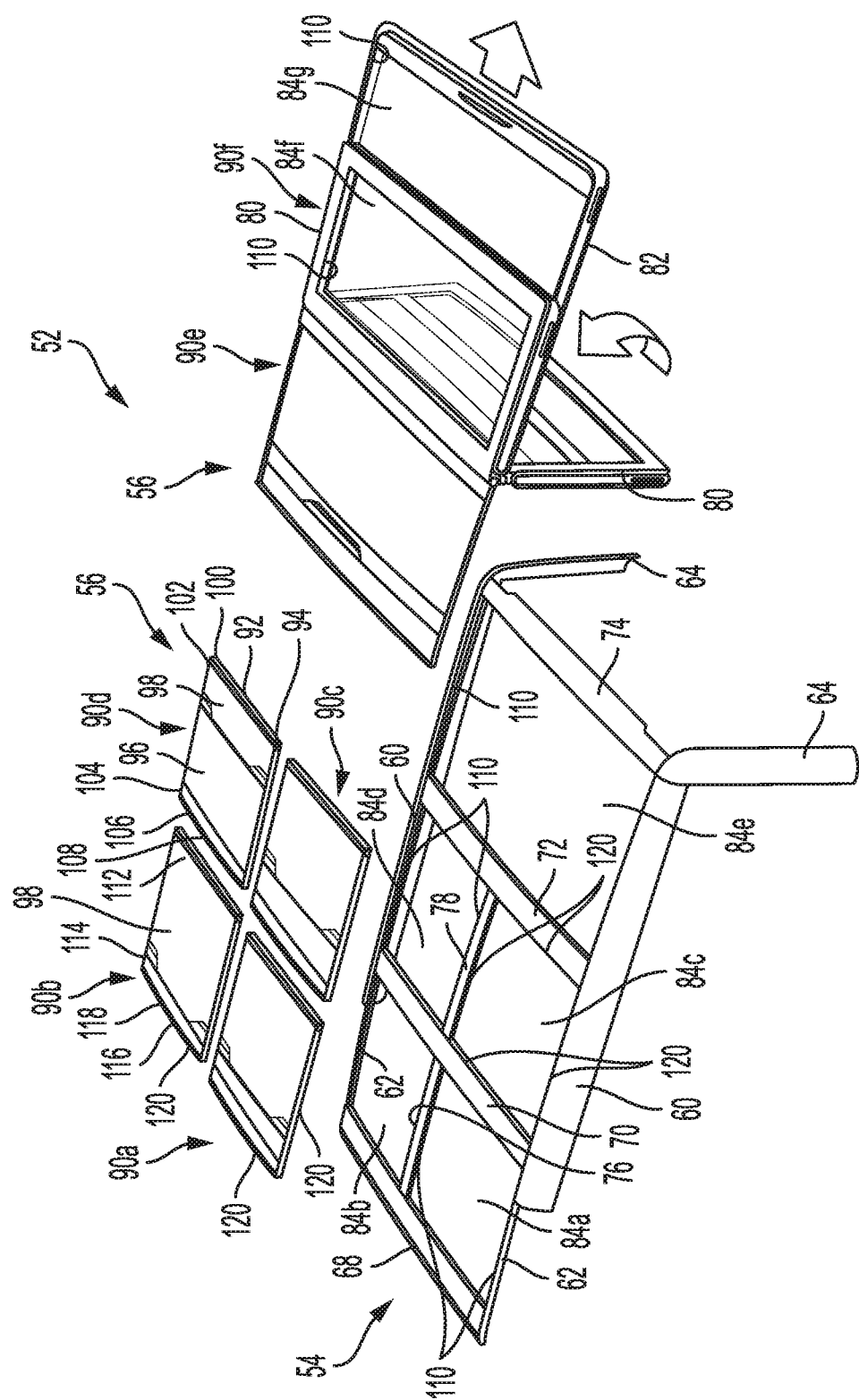
FIG. 2 is an exploded view of the modular overhead cover assembly shown in FIG. 1 in accordance with the principles of the present disclosure.

With additional reference to FIG. 2, in the example embodiment, the convertible top system 12 generally includes a vehicle roof 50 (FIG. 1) and a sub-roof or overhead cover system 52 disposed between the roll bar assembly 30 and the vehicle roof 50. In the example embodiment, the vehicle roof 50 is a hard top assembly that is selectively removable from the vehicle body 14 to create an open air experience. It will be appreciated, however, that vehicle roof 50 may alternatively be a soft top assembly configured to articulate between a deployed position where it substantially covers the overhead cover system 52 and roll bar assembly 30 to enclose a vehicle interior 26, and a stowed position where it is folded down upon itself and generally located at a rear of the vehicle 10 generally between the rear seating 20 and the tailgate 24. As noted above and described herein in more detail, removal of vehicle roof 50 from vehicle 10 subsequently exposes the overhead cover system 52, which enables users to selectively open and close/cover various portions thereof depending on weather and preference.

As shown in FIG. 2, in the example embodiment, overhead cover system 52 generally includes a perimeter frame 54 configured to removably receive one or more cartridges or cassettes of a cassette system 56. As illustrated, the overhead cover system 52 is at least partially supported by the roll bar assembly 30. However, it will be appreciated that overhead cover system 52 may be supported by another portion of a vehicle such as, for example, a structural frame or structural support.

In the illustrated example, perimeter frame 54 includes a pair of laterally spaced main side frame members 60, a pair of laterally spaced forward side frame members 62, and a pair of laterally spaced apart vertical frame members 64. The frame members 60, 62, 64 are each removably coupled to the vehicle body 14 such as at the roll bar assembly 30 and/or the windshield assembly 46, for example, via clip, fastener, or the like. A forward transverse frame member 68, a front intermediate transverse frame member 70, a rear intermediate transverse frame member 72, and a rearward transverse frame member 74 are each coupled to and extend in a generally cross-car direction between either the main side frame members 60 or the forward side frame members 62.

Further, a forward dividing frame member 76 and a rearward dividing frame member 78 are disposed generally centrally between the main side frame members 60 and the forward side frame members 62. The forward dividing frame member 76 is coupled between the forward transverse frame member 68 and the front intermediate transverse frame member 70, and the rearward dividing frame member 78 is coupled between the front intermediate transverse frame member 70 and the rear intermediate transverse frame member 72. In some implementations, each frame member is coupled to another frame member, for example, via clip, faster, or the like. Finally, a liftgate frame member 80 is rotatably coupled the rearward transverse frame member 74 and/or the vertical frame members 64 and movable between a closed position (FIG. 3) and an open position (FIG. 1), with both positions shown in FIG. 2. Additionally, the liftgate frame member 80 includes a telescoping frame 82, which can slide outwardly from the liftgate frame member 80 when in the open position (FIG. 1), as described herein in more detail.

In this way, as shown in FIG. 2, the perimeter frame 54 generally defines a plurality of overhead compartments or openings 84 between the various frame members. In the example configuration, perimeter frame 54 defines a driver overhead opening 84a, a passenger overhead opening 84b, a second row driver side overhead opening 84c, a second row passenger side overhead opening 84d, and a rear cargo area overhead opening 84e. A rear opening 84f is also defined in the liftgate frame member 80, and an opening 84g is defined in the telescoping frame 82. Although shown in a four door configuration, it will be appreciated that perimeter frame 54 can be adapted to a vehicle with a two door configuration.

With continued reference to FIGS. 1 and 2, the cassette system 56 will be described in more detail. As shown in the illustrated embodiments, the cassette system 56 includes one or more cartridges or cassettes 90 each configured for removable coupling with the perimeter frame 54 and movable to any position between a fully open position 86 where overhead openings 84 are uncovered, and a fully closed position 88 where the cassette 90 is deployed to cover the overhead opening 84 (see FIG. 2). It is envisioned that one or more of cassettes 90 are modular and thus interchangeable between the variously defined overhead openings 84. For example, a single cassette 90 may be sized and shaped to be received within any of overhead openings 84a-84d. Similarly, a single cassette 90 may be sized and shaped to be received in either of overhead opening 84e and rear opening 84f. As shown in FIG. 1, although all cassettes 90 are shown installed at a vehicle rearward end of the overhead opening 84, it will be appreciated that some or all cassettes 90 may be installed at a vehicle forward end of the overhead opening 84.

In the example embodiment, each cassette 90 generally includes a housing 92 rotatably supporting a roller bar 94, a mesh screen 96, a sun shade 98, and a retractor mechanism 100. The mesh screen 96 includes a first end 102 coupled to the roller bar 94 and an opposite free end 104 having a handle 106 with an attachment device 108 (e.g., a hook, fastener, clip, etc.) for removably coupling to the perimeter frame 54. In some embodiments, the mesh screen 96 is configured to slide along a track 110 formed in the perimeter frame 54 to facilitate directing and securing mesh screen 96 as it moves between the fully opened and fully closed positions. Similarly, the shade 98 includes a first end 112 coupled to the roller bar 94 and an opposite free end 114 having a handle 116 with an attachment device 118 (e.g., a hook, fastener, clip, etc.) for removably coupling to the perimeter frame 54. Shade 98 is similarly configured to slide along track 110 as it moves between the fully opened and closed positions. In the illustrated example, one or more portions of the perimeter frame 54, mesh screen 96, and shade 98 (e.g., free ends 104, 114) include a weather seal 120 configured to provide watertight sealing between the perimeter frame 54 and the screen/shade 96, 98 to facilitate preventing precipitation from entering therebetween into the vehicle interior 26.

The retractor mechanism 100 is operably coupled to the roller bar 94 and includes a biasing mechanism (e.g., a coil spring) configured to automatically retract the mesh screen 96 or shade 98 when activated such that mesh screen 96 and shade 98 are rolled up on the roller bar 94. In alternative configurations, mesh screen 96 and shade 98 each include their own separate roller bar 94 and associated retractor mechanism 100 housed within the housing 92. In a retracted position, the mesh screen 96 and shade 98 are rolled up upon their individual roller bar 94. Moving to a deployed position, the roller bar 94 is rotated and the associated mesh screen 96 or shade 98 is unrolled from the roller bar 94 to stretch across the associated overhead opening 84.

In the example embodiment, the mesh screen 96 is a meshed screen material that provides a predetermined amount of light and/or air therethrough. In one embodiment, shade 98 is fabricated from a substantially opaque, water resistant material configured to prevent light, wind, and/or precipitation from passing therethrough and thus through the opening 84 when in a closed position.

In an alternative configuration, rather than having a roller bar 94 and retractor mechanism 100, mesh screen 96 and shade 98 are configured to foldably collapse (e.g., like an accordion) as they are moved from the fully open position to the fully closed position. Although, such a configuration may still have a retractor mechanism 100 to retract the mesh screen 96 and the shade 98 back into the fully closed position.

Turning again to FIG. 2, the cassette system 56 will be described in more detail. In the example embodiment, cassette system 56 generally includes a driver overhead cassette 90a, a passenger overhead cassette 90b, a second row driver side overhead cassette 90c, a second row passenger side overhead cassette 90d, a rear cargo area overhead cassette 90e, and an optional rear liftgate cassette 90f.

Figure 3:
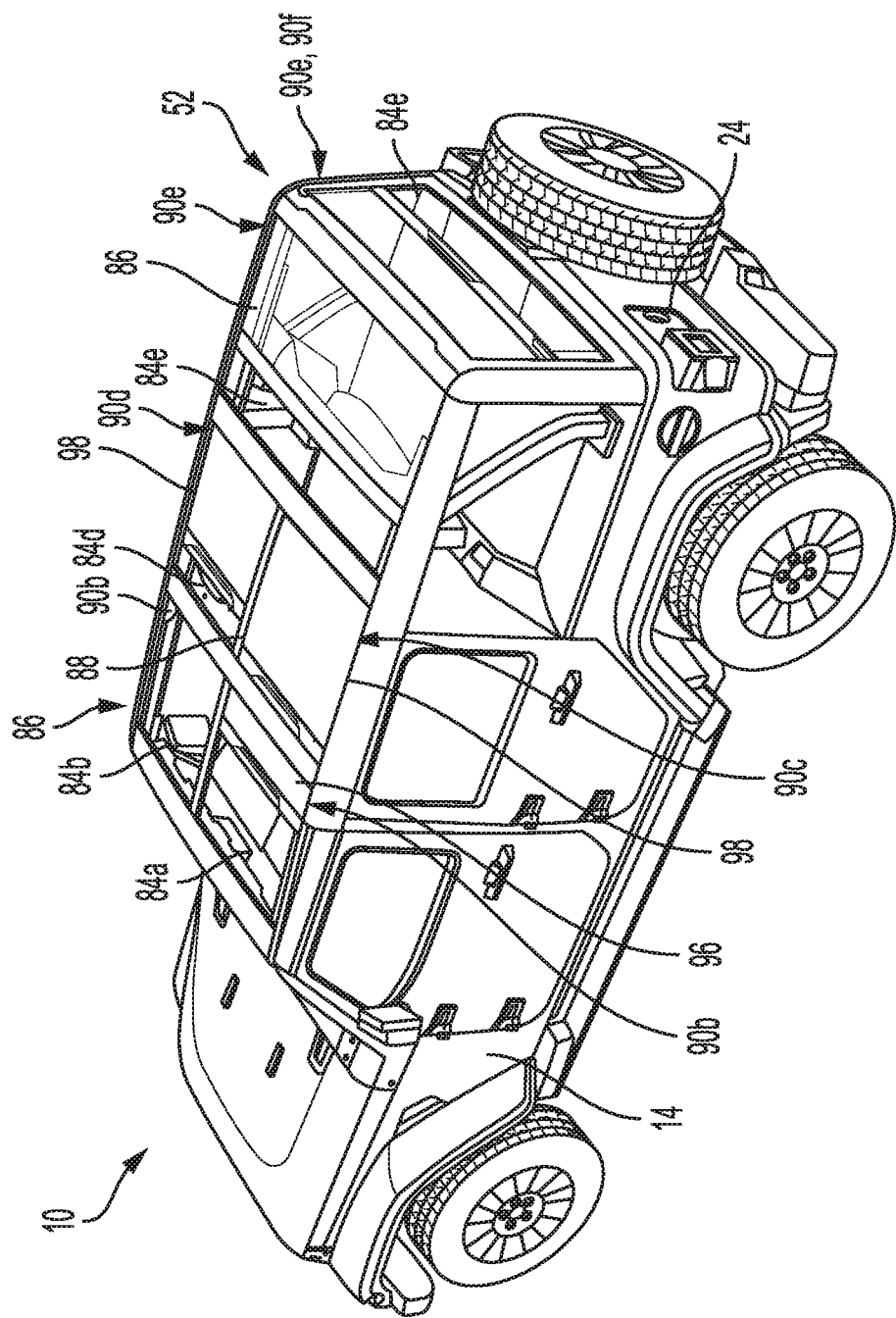
FIG. 3 is a top perspective view of the modular overhead cover assembly shown in FIG. 1 with individual cassettes in various coverage positions, in accordance with the principles of the present disclosure.

As shown in FIG. 3, driver overhead cassette 90a is removably installed into the driver overhead opening 84a by releasably coupling to at least one of the main side frame member 60, the forward side frame member 62, the front intermediate transverse frame member 70 and the forward dividing frame member 76. The driver overhead cassette 90a is disposed at a rearward end of the overhead opening 84a toward the forward intermediate transverse frame member 70, but is alternatively disposed at a forward end of the overhead opening 84a toward the front transverse frame member 68. Driver overhead cassette 90a is shown with the mesh screen 96 in a partially deployed position.

To move from the fully open position to the fully closed position, a user grasps handle 106 and pulls toward a front of the vehicle 10. The free end 104 slides along track 110 until the attachment device 108 reaches the forward transverse frame member 68 and is coupled thereto. To return to the fully closed position, the attachment device 108 is disconnected from the forward transverse frame member 68 and the retraction mechanism 100 is actuated to thereby rotate the roller bar 94, which rolls up the mesh screen 96 and returns the free end 104 to the rearward end of the overhead opening 84a.

Similarly, to move shade 98 from the fully open position to the fully closed position, the user grasps handle 116 and pulls toward a front of the vehicle 10. The free end 114 slides along track 110 until the attachment device 118 reaches the forward transverse frame member 68 and is coupled thereto. To return to the fully closed position, the attachment device 118 is disconnected from the forward transverse frame member 68 and the retraction mechanism 100 is actuated to thereby rotate roller bar 94, which rolls up the shade 98 and returns the free end 114 to the rearward end of the overhead opening 84a.

To move either of mesh screen 96 and shade 98 to a partially deployed position, the user simply grasps the handle 106, 116 and moves the free end 104, 114 to a position along track 110 providing the desired overhead coverage. To return to the fully open position, the retraction mechanism 100 is actuated and the screen/shade 96, 98 are returned to the retracted position.

The passenger overhead cassette 90b is removably installed into the passenger overhead opening 84b by releasably coupling to at least one of the main side frame member 60, the forward side frame member 62, the front intermediate transverse frame member 70, and the forward dividing frame member 76. Passenger overhead cassette 90b is shown in the fully open or retracted position 86 to allow for an open air feeling for the associated passenger and operates in a similar manner to overhead cassette 90a when moving either of mesh screen 96 and shade 98 between the fully open and fully closed positions.

The second row driver side overhead cassette 90c is removably installed into the second row driver side overhead opening 84c by releasably coupling to at least one of the main side frame member 60, the rear intermediate transverse frame member 72, and the rearward dividing frame member 78. In this position, attachment devices 108, 118 are configured to releasably couple to the front intermediate transverse frame member 70 to fully cover the overhead opening 84c. Second row driver side overhead cassette 90c is shown in FIG. 3 with the shade 98 in the fully closed or deployed position 88 to completely cover the second row driver side overhead opening 84c and facilitate preventing light, wind, precipitation, and/or debris from passing therethrough. Second row driver side overhead cassette 90c operates in a similar manner to overhead cassette 90a when moving either of mesh screen 96 and shade 98 between the fully open and fully closed positions.

The second row passenger side overhead cassette 90d is removably installed into the second row passenger side overhead opening 84d by releasably coupling to at least one of the main side frame member 60, the rear intermediate transverse frame member 72, and the rearward dividing frame member 78. In this position, attachment devices 108, 118 are configured to releasably couple to the front intermediate transverse frame member 70 to fully cover the overhead opening 84d. Second row passenger side overhead cassette 90d is shown in FIG. 3 with the shade 98 in a partially deployed position and operates in a similar manner to overhead cassette 90a when moving either of mesh screen 96 and shade 98 between the fully open and fully closed positions.

The rear cargo area overhead cassette 90e is removably installed into the rear cargo area overhead opening 84e by releasably coupling to at least one of either or both of the main side frame members 60, the rearward transverse frame member 74, and the liftgate frame member 80. In the example embodiment, rear cargo area overhead cassette 90e is uniquely positioned to be deployed to: (i) cover the rear cargo area overhead opening 84e, (ii) cover the liftgate frame rear opening 84f when the liftgate frame member 80 is in the closed position, or (iii) provide a shaded canopy 130 (see FIG. 1) at the rear of vehicle 10 by covering both the liftgate frame rear opening 84f and the telescoping frame opening 84g when the liftgate frame member 80 is in the open position and the telescoping frame 82 is extended outwardly therefrom. As such, in this position, attachment devices 108, 118 are configured to releasably couple to (i) the rear intermediate transverse frame member 72 to fully cover the overhead opening 84e, (ii) a bottom of the liftgate frame member to fully cover the liftgate frame rear opening 84f, or (iii) a bottom of the telescoping frame 82 to fully cover the telescoping frame opening 84g.

In an alternative embodiment, rear cargo area overhead cassette 90e is removably installed into the rear cargo area overhead opening 84e for covering thereof, and a separate rear liftgate cassette 90f is removably installed into the liftgate frame rear opening 84f by releasably coupling to at least one of either or both of the main side frame members 60, the rearward transverse frame member 74, and the liftgate frame member 80. In this position, attachment devices 108, 118 are configured to releasably couple to the bottom of the liftgate frame member 80 to fully cover the liftgate frame rear opening 84f, or to the bottom of the telescoping frame 82 to fully cover the telescoping frame opening 84g. Rear liftgate cassette 90f is shown in FIG. 1 with the mesh screen 96 fully deployed into the shaded canopy position, and shown in FIG. 3 with the mesh screen 96 in a partially deployed position. Rear liftgate cassette 90f operates in a similar manner to overhead cassette 90a when moving either of mesh screen 96 and shade 98 between the fully open and fully closed positions.

Described herein are systems and methods for a vehicle convertible top having an overhead cover system disposed beneath a removable vehicle roof. Once the vehicle roof is removed, the overhead cover system provides a perimeter frame over the vehicle designed to receive modular cassettes that house both retractable mesh screens and retractable shades. By utilizing the separate cassettes, various sections of the roof can be individually fully opened to the outside or quickly closed via the system of shades in case of rain. If the sun is too bright, an occupant can temporarily close the shade or mesh screen to provide protections as individually needed. Weather and sun protection is also afforded via a shaded canopy that extends out the rear of the liftgate from the cargo area cassette.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A convertible top system for a vehicle having structural support for a vehicle roof, the system comprising:
    an overhead cover system comprising:
        a perimeter frame configured to couple to the structural support and defining a plurality of overhead openings; and
        a plurality of cassettes configured to releasably couple to the perimeter frame such that each cassette of the plurality of cassettes is operably associated with one of the overhead openings,
        wherein each cassette of the plurality of cassettes includes at least one of a retractable mesh screen and a retractable shade configured to be moved between a fully open position that does not cover the associated overhead opening, and a fully closed position that covers the associated overhead opening.

2. The convertible top system of claim 1, wherein each cassette of the plurality of cassettes includes both the retractable mesh screen and the retractable shade, and wherein each cassette of the plurality of cassettes is modular and interchangeable between each overhead opening of the plurality of overhead openings.

3. The convertible top system of claim 1, wherein each cassette of the plurality of cassettes further includes a housing rotatably supporting a roller bar operably associated with a retractor mechanism.

4. The convertible top system of claim 3, wherein each of the at least one retractable mesh screen and retractable shade include a first end coupled to the roller bar and are configured to be rolled up on the roller bar.

5. The convertible top system of claim 4, wherein each of the at least one retractable mesh screen and retractable shade further include an opposite second end having a handle with an attachment device, wherein a user is able to grasp the handle to draw the mesh screen or the shade to the fully closed position and couple the attachment device to the perimeter frame.

6. The convertible top system of claim 1, wherein each of the at least one retractable mesh screen and retractable shade are configured to slide along a track formed in the perimeter frame when moving between the fully opened and fully closed positions.

7. The convertible top system of claim 1, wherein the perimeter frame comprises:
    a pair of laterally spaced main side frame members; and
    a pair of laterally spaced forward side frame members.

8. The convertible top system of claim 7, wherein the perimeter frame further comprises:
    a forward transverse frame member coupled between the forward side frame members;
    an intermediate transverse frame member coupled between the main side frame members; and
    a forward dividing frame member coupled between the forward transverse frame member and the intermediate transverse frame member,
    wherein the forward transverse frame member, the intermediate transverse frame member, and the forward dividing frame member define (i) a driver overhead opening over a driver seat of the vehicle and (ii) a passenger overhead opening above a passenger seat of the vehicle, each of (i) and (ii) configured to receive and be selectively covered by one of the cassettes.

9. The convertible top system of claim 7, wherein the perimeter frame further comprises:
    a front intermediate transverse frame member coupled between the main side frame members;
    a rear intermediate transverse frame member coupled between the main side frame members; and
    a rearward dividing frame member coupled between the front intermediate transverse frame member and the rear intermediate transverse frame member,
    wherein the a front intermediate transverse frame member, the rear intermediate transverse frame member, and the rearward dividing frame member define (i) a second row driver side overhead opening over a second row seat and (ii) a second row passenger side overhead opening over the second row seat, each of (i) and (ii) configured to receive and be selectively covered by one of the cassettes.

10. The convertible top system of claim 7, wherein the perimeter frame further comprises:
    an intermediate transverse frame member coupled between the main side frame members; and
    a rearward transverse frame member,
    wherein the intermediate transverse frame member and the rearward transverse frame member define a rear cargo area overhead opening disposed above a rear cargo area of the vehicle and configured to receive and be selectively covered by one of the cassettes.

11. The convertible top system of claim 7, wherein the perimeter frame further comprises:
    a pair of laterally spaced apart vertical members;
    a rearward transverse frame member coupled between the main side frame members; and
    a liftgate frame member rotatably coupled to at least one of the vertical members and the rearward transverse member and movable between a closed position and an open position, wherein the liftgate frame member defines a rear opening configured to receive and be selectively covered by one of the cassettes.

12. The convertible top system of claim 11, wherein the perimeter frame further comprises a telescoping frame telescopically coupled to the liftgate frame member and defining a telescoping frame opening configured to be selectively covered by one of the cassettes to establish a shaded canopy when the liftgate is in the open position and the telescoping frame is telescoped.

13. The convertible top system of claim 1, further comprising the vehicle roof, which is configured to removably couple to the vehicle over the overhead cover system, such that the overhead cover system is disposed between the structural support and the vehicle roof.

14. The convertible top system of claim 13, wherein the vehicle roof is a hard top assembly configured to be removably coupled to the vehicle.

15. A vehicle comprising:
a body;
a structural support for a vehicle roof; and
an overhead cover system comprising:
a perimeter frame configured to couple to the structural support and defining a plurality of overhead openings; and
a plurality of cassettes configured to releasably couple to the perimeter frame such that each cassette of the plurality of cassettes is operably associated with one of the overhead openings,
wherein each cassette of the plurality of cassettes includes at least one of a retractable mesh screen and a retractable shade configured to be moved between a fully open position that does not cover the associated overhead opening, and a fully closed position that covers the associated overhead opening.

16. The vehicle of claim 15, wherein the overhead cover system further comprises the vehicle roof, which is configured to removably couple to the vehicle over the overhead cover system, such that the overhead cover system is disposed between the structural support and the vehicle roof.

17. The vehicle of claim 15, wherein each cassette of the plurality of cassettes includes both the retractable mesh screen and the retractable shade, and
wherein each cassette of the plurality of cassettes further includes a housing rotatably supporting a roller bar operably associated with a retractor mechanism.

18. The vehicle of claim 15, wherein the perimeter frame comprises:
a pair of laterally spaced main side frame members;
a pair of laterally spaced forward side frame members;
a forward transverse frame member coupled between the forward side frame members;
a front intermediate transverse frame member coupled between the main side frame members;
a rear intermediate transverse frame member coupled between the main side frame members;
a rearward transverse frame member coupled between the main side frame members;
a forward dividing frame member coupled between the forward transverse frame member and the front intermediate transverse frame member; and
a rearward dividing frame member coupled between the front intermediate transverse frame member and the rear intermediate transverse frame member,
wherein the perimeter frame defines:
a driver overhead opening over a driver seat of the vehicle and configured to receive and be selectively covered by one cassette of the plurality of cassettes;
a passenger overhead opening above a passenger seat of the vehicle and configured to receive and be selectively covered by one cassette of the plurality of cassettes;
a second row driver side overhead opening over a second row seat of the vehicle and configured to receive and be selectively covered by one cassette of the plurality of cassettes;
a second row passenger side overhead opening over the second row seat of the vehicle and configured to receive and be selectively covered by one cassette of the plurality of cassettes; and
a rear cargo area overhead opening disposed above a rear cargo area of the vehicle and configured to receive and be selectively covered by one cassette of the plurality of cassettes.

19. The vehicle of claim 18, wherein the perimeter frame further comprises:
a pair of laterally spaced apart vertical members; and
a liftgate frame member rotatably coupled to at least one of the vertical members and the rearward transverse member and movable between a closed position and an open position,
wherein the liftgate frame member defines a rear opening configured to receive and be selectively covered by one cassette of the plurality of cassettes.

* * * * *